Patented Sept. 16, 1930

1,775,716

UNITED STATES PATENT OFFICE

HERBERT H. DOW AND JOHN J. GREBE, OF MIDLAND, MICHIGAN, ASSIGNORS TO THE DOW CHEMICAL COMPANY, OF MIDLAND, MICHIGAN, A CORPORATION OF MICHIGAN

COMPOSITION OF MATTER

No Drawing.   Application filed December 13, 1926. Serial No. 154,648.

This invention relates to compositions of matter, and more particularly compositions with an organic basal material. We have found that certain organic compounds of aryl type are not only very stable against decomposition under controlled conditions, but that by suitable modification, properties of physical character making possible adaptation to various industrial usages may be had; and it is among the objects of the present invention to provide compositions having qualities along the desired lines. Other objects and advantages will appear as the description proceeds.

To the accomplishment of the foregoing and related ends, the invention, then, consists of the features hereinafter fully described, and particularly pointed out in the claims, the following description setting forth in detail but a few of the various ways in which the principle of the invention may be employed.

In accordance with our invention, an aryl compound of stable molecular structure and one or more modifying substances are provided in physical combination. As an illustrative example: A composition made up of diphenyl oxide, $C_{12}H_{10}O$, and carbon tetrachloride, $CCl_4$, has a high dielectric strength, large coefficient of expansion, and a solidification point of $-5°$ C. or upward, depending upon the proportion of carbon tetrachloride. For instance, proportions of 70–95% of diphenyl oxide and 5–30% of carbon tetrachloride may be employed. A composition of 80% diphenyl oxide and 20% carbon tetrachloride has an initial boiling point of 115° C., and in exposure to low temperatures its fluidity persists over a feasible and practicable range, the melting point or temperature of first crystal formation being about 15° C., and the final freezing temperature or point of solidification being about $-2°$ C. This advantage is secured by the compound character of the material, the starting of crystal formation in one component of the mixture occasioning an increasing concentration of the remainder, and the final point of solidification of the residue thus occurring below a progressing range of slush formation rather than as an abrupt setting which would not allow of any readjustment of stresses in the mass and its container. The dielectric strength of such a composition is about 300,-000 volts per centimeter before break down. Other chlor-compounds may be used in lieu of carbon tetrachloride, depending upon the particular usage in view.

As another instance: Diphenyl oxide and naphthyl methyl ether, $C_{10}H_{10}O$, e. g. diphenyl oxide 60% and naphthyl methyl ether 40% may be mentioned. This has a boiling point of about 260° C. and a melting point of about 5.5° C. and a dielectric strength of about 300,000 volts per centimeter before breakdown.

Such compositions have a substantial dielectric character coupled with a practicably low melting point, lower than that of diphenyl oxide alone, and are suitable in transformers, immersion switches, etc., and by reason of their excellent heat transfer properties are well adapted for such purposes; additionally they are well adapted for heat transfer use generally in power plants, etc.

Other modes of applying the principle of the invention may be employed, change being made as regards the details disclosed, provided the ingredients stated in any of the following claims or the equivalent of such be employed.

We therefore particularly point out and distinctly claim as our invention:—

1. A composition of matter, which comprises diphenyl oxide and a smaller amount of an organic compound miscible therewith for lowering the melting point.

2. A composition of matter, which comprises diphenyl oxide and a smaller amount of an organic chlor-compound, said composition having a dielectric strength of not less than 50,000 volts per centimeter.

3. A composition of matter, which comprises diphenyl oxide and a smaller amount of carbon tetrachloride.

4. A composition of matter, which consists of from 70 to 95 per cent diphenyl oxide and 5 to 30 per cent of carbon tetrachloride.

5. A composition of matter, which comprises diphenyl oxide about 80%, and carbon tetrachloride about 20%.

Signed by us this 3rd day of December, 1926.

HERBERT H. DOW.
JOHN J. GREBE.